United States Patent
Paik et al.

(10) Patent No.: US 8,415,048 B2
(45) Date of Patent: Apr. 9, 2013

(54) BATTERY AND BATTERY PACK COMPRISING THE SAME

(75) Inventors: Meen-seon Paik, Seongnam-si (KR); Tae-sang Park, Suwon-si (KR); Young-min Choi, Suwon-si (KR); Jin-hwan Park, Seoul (KR); Ji-sang Yu, Yongin-si (KR); Ji-young Jeong, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 12/534,211

(22) Filed: Aug. 3, 2009

(65) Prior Publication Data
US 2010/0151301 A1  Jun. 17, 2010

(30) Foreign Application Priority Data
Dec. 16, 2008  (KR) .................. 10-2008-0128186

(51) Int. Cl.
*H01M 10/50* (2006.01)
*H01M 6/10* (2006.01)

(52) U.S. Cl. .......................... 429/120; 429/94
(58) Field of Classification Search .............. 429/94, 429/120
See application file for complete search history.

(56) References Cited

U.S. PATENT DOCUMENTS

| 3,490,949 | A | * | 1/1970 | Deschamps | 429/94 |
| 4,262,064 | A | * | 4/1981 | Nagle | 429/94 |
| 5,674,641 | A | * | 10/1997 | Cheu | 429/306 |
| 2002/0146220 | A1 | * | 10/2002 | Gould et al. | 385/95 |
| 2005/0174092 | A1 | * | 8/2005 | Dougherty et al. | 320/128 |
| 2005/0260491 | A1 | * | 11/2005 | Cho | 429/178 |

FOREIGN PATENT DOCUMENTS

| JP | 6-23157 | | 3/1994 |
| JP | 10112330 A | * | 4/1998 |
| JP | 11-329514 | | 11/1999 |
| JP | 2002042770 A | * | 2/2002 |
| JP | 2002231298 A | * | 8/2002 |
| JP | 2006278184 A | * | 10/2006 |
| JP | 2006-331874 | | 12/2006 |
| JP | 2006-351373 | | 12/2006 |
| JP | 2008235251 A | * | 10/2008 |
| KR | 1999-0031053 | | 5/1999 |
| KR | 10-2007-0014656 | | 2/2007 |

OTHER PUBLICATIONS

English Abstract of KR 10-0302735 issued Jul. 5, 2001.

* cited by examiner

*Primary Examiner* — Gregg Cantelmo
(74) *Attorney, Agent, or Firm* — Stein IP, LLC

(57) ABSTRACT

A battery and a battery pack including the battery. The battery includes: a frame; an electrode assembly disposed around the frame; a main body to house the electrode assembly; and electrode terminals extending from the electrode assembly in a first direction, through the main body. A cooling hole extends through opposing sides of the main body, in a second direction that is generally perpendicular to the first direction.

19 Claims, 8 Drawing Sheets

BATTERY AND BATTERY PACK COMPRISING THE SAME

CROSS-REFERENCE TO RELATED APPLICATION

This application claims the benefit of Korean Patent Application No. 2008-128186, filed on Dec. 16, 2008, in the Korean Intellectual Property Office, the disclosure of which is incorporated herein in its entirety by reference.

BACKGROUND

1. Field

The present teachings relate to a battery and a battery pack including the battery.

2. Description of the Related Art

Recently, due to developments related to electric and hybrid cars, power storage, and various mobile devices, research and development in secondary batteries has been actively conducted. Low capacity secondary batteries are used in small electronic appliances, such as laptop computers. Large capacity secondary batteries, which including a plurality of secondary battery cells, are used in devices having high demand for electric power, such as electric cars.

When charging/discharging a secondary battery, heat is generated in the battery, and in particular, in a central portion of the battery. The greater the capacity of a battery the more heat is generated, since the charging/discharging is performed using higher load currents. Heat generation may reduce the lifespan of a battery and may cause problems regarding the performance and safe handling of a battery. Therefore, a secondary battery having improved heat dissipating capabilities is needed.

SUMMARY

According to various embodiments of the present teachings, provided is a battery having excellent heat dissipating efficiency, and a battery pack including the battery.

According to various embodiments of the present teachings, provided is a battery including: an electrode assembly, a main body to house the electrode assembly, and a cooling hole, wherein the cooling hole extends in a first direction; and terminals that extend from the electrode assembly in a first direction. The battery includes a cooling hole that extends through opposing sides of the main body, in a second direction.

According to various embodiments of the present teachings, the first direction and the second direction may be perpendicular to each other.

According to various embodiments of the present teachings, the cooling hole may penetrate the main body in a lateral direction, and the anode terminal and the cathode terminal may protrude upward of the main body.

According to various embodiments of the present teachings, the main body may be a prismatic or ovoid in cross-section.

According to various embodiments of the present teachings, the battery may include a frame that at least partially defines the cooling hole, and the electrode assembly may be formed around the frame.

According to various embodiments of the present teachings, the electrode assembly may be a jelly-roll type.

According to various embodiments of the present teachings, opposing ends of the electrode assembly may include an anode uncoated region and a cathode uncoated region, the anode terminal may be connected to the anode uncoated region, and the cathode terminal may be connected to the cathode uncoated region.

According to various embodiments of the present teachings, the battery may further include compressing members to respectively compress the anode uncoated region and the cathode uncoated region against the frame.

According to various embodiments of the present teachings, the battery may further include supporting members disposed between the anode and cathode uncoated regions, and the frame.

According to various embodiments of the present teachings, the anode terminal and the cathode terminal may contact corresponding ones of the compressing members.

According to various embodiments of the present teachings, the main body may include: a case disposed around the electrode assembly; and two side walls attached to opposing sides of the case, the side walls having holes that at least partially define the cooling hole.

According to various embodiments of the present teachings, the battery may further include a cooling tube that extends through the cooling hole.

According to various embodiments of the present teachings, provided is a battery pack including a plurality of the batteries.

According to various embodiments of the present teachings, the plurality of batteries may be connected to each other in series, in parallel, or in a combination thereof.

According to various embodiments of the present teachings, the battery pack may further include at least one cooling tube passing through the cooling holes of the batteries.

According to various embodiments of the present teachings, the plurality of batteries and the at least one cooling tube may form a plurality of rows and/or columns.

Additional aspects and/or advantages of the present teachings will be set forth in part in the description which follows and, in part, will be obvious from the description, or may be learned by practice of the present teachings.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION

Figure 1:
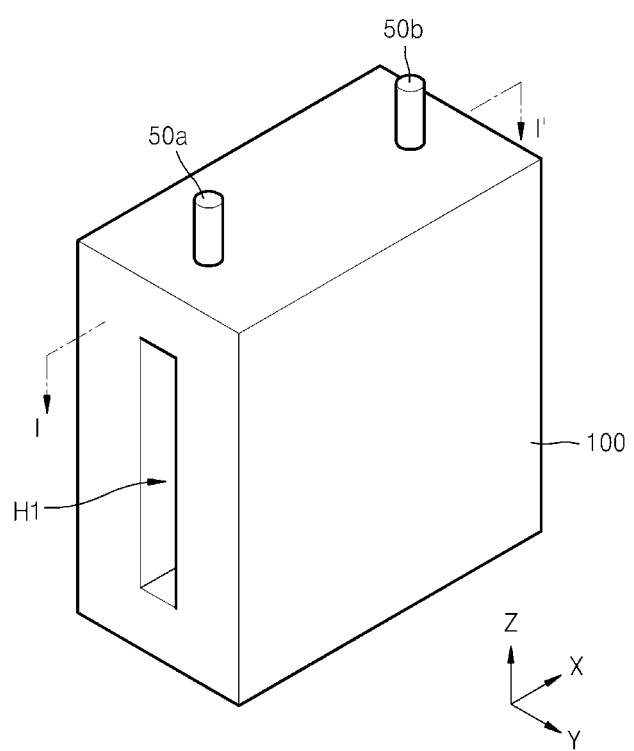
FIG. 1 is a perspective view of a battery, according to an exemplary embodiment.

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures.

Detailed illustrative exemplary embodiments are disclosed herein. However, specific structural and functional details disclosed herein are merely representative for purposes of describing exemplary embodiments. This invention may, however, may be embodied in many alternate forms and should not be construed as limited to only the exemplary embodiments set forth herein.

Accordingly, while exemplary embodiments are capable of various modifications and alternative forms, embodiments thereof are shown by way of example in the drawings and will herein be described in detail. It should be understood, however, that there is no intent to limit the present teachings to the particular forms disclosed, but on the contrary, the present teachings include all modifications, equivalents, and alternatives falling within the scope of the invention.

It will be understood that, although the terms first, second, etc. may be used herein to describe various elements, these elements should not be limited by these terms, as these terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

Herein, when a first element is referred to as being formed or disposed "on" a second element, the first element can be disposed directly on the second element, or one or more other elements may be disposed therebetween. When a first element is referred to as being formed or disposed "directly on" a second element, no other elements are disposed therebetween. Other words used to describe the relationship between elements or layers should be interpreted in a like fashion (e.g., "between," versus "directly between," "adjacent," versus "directly adjacent," etc.).

As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. In the drawings, the thicknesses of layers and regions are exaggerated for clarity.

FIG. 1 is a perspective view of a battery according to an exemplary embodiment of the present teachings. Referring to FIG. 1, the battery includes a main body 100. The main body 100 may be prismatic. The shape of the main body 100 may be in various ways modified. A cooling hole H1 extends through the main body 100 in a lateral direction (X-axis direction), through the center of the main body 100. An anode terminal 50a and a cathode terminal 50b extend out of the main body 100. The anode terminal 50a and the cathode terminal 50b may extend in a different direction from the direction in which the cooling hole H1 extends. For example, the anode terminal 50a and the cathode terminal 50b may protrude upward (Z-axis direction) from the main body 100.

Figure 2:
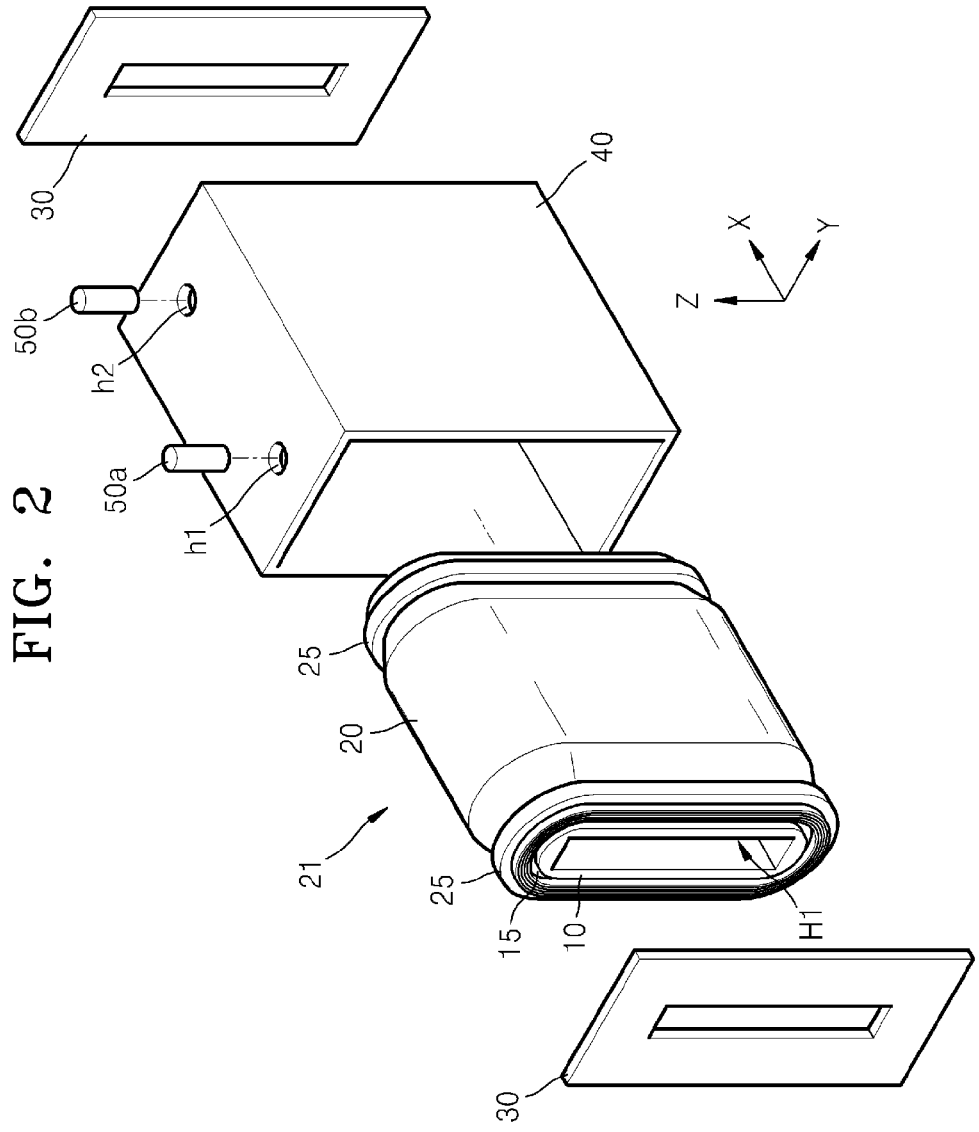
FIG. 2 is an exploded perspective view of the battery of FIG. 1.
Figure 3:
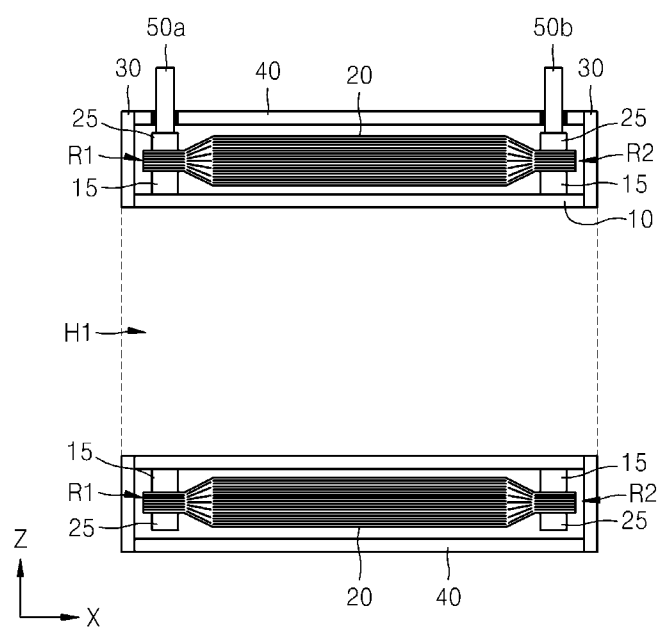
FIG. 3 is a cross-sectional view of the battery, taken along line I-I' of FIG. 1.
Figure 4:
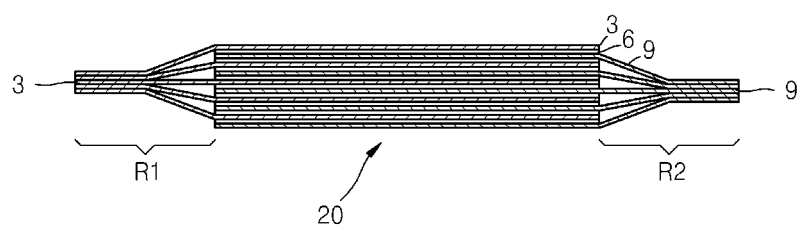
FIG. 4 is a partial cross-sectional view of an electrode assembly of the battery of FIG. 1.

FIG. 2 is an exploded perspective view of the battery of FIG. 1, and FIG. 3 is a cross-sectional view of the battery, taken along plane I-I' of FIG. 1. FIG. 4 is an enlarged cross-sectional view showing the structure of an electrode assembly 20 shown in FIG. 3.

Referring to FIG. 2, the battery includes a core pack 21 that is housed in the main body 100. The core pack 21 includes: the electrode assembly 20; a frame 10 disposed within the electrode assembly 20, supporting members 15 disposed around opposing ends of the frame 10; and compressing members 25 that surround the supporting members 15. The frame 10 at least partially defines the cooling hole H1, i.e., the frame 10 is hollow. The frame 10 may be rectangular, cylindrical, or the like, in cross-section. For example, the frame 10 may be a rectangular prism, or may have one or more curved outer surfaces. The height of the frame 10 in the Z-axis direction may be longer than the width thereof in the Y-axis direction. The structure of the frame 10 may be modified in various ways.

The supporting members 15 and the compressing members 25 are generally annular, and may be formed of a conductive material, for example, a metal. Opposing ends of the electrode assembly 20 are compressed between the supporting members 15 and the compressing members 25. Here, one of the opposing ends of the electrode assembly 20 may be referred to as an anode end and the other may be referred to as a cathode end.

The main body 100 (FIG. 1) includes two side walls 30 and a case 40. Each of the side walls 30 may include a hole that at least partially defines the cooling hole H1. Once the core pack 21 is disposed in the case 40, each of the side walls 30 may be welded to the case 40 and the frame 10.

Holes h1 and h2 may be formed in an upper surface of the case 40, and the anode terminal 50a and the cathode terminal 50b may be connected to the core pack 21, through the holes h1 and h2. In more detail, the anode terminal 50a and the cathode terminal 50b are attached to respective ones of the compressing members 25. Therefore, the anode terminal 50a and the cathode terminal 50b are electrically connected to the anode end and the cathode end of the electrode assembly 20, respectively FIG. 3 is a cross-sectional view of the battery taken along line I-I' of FIG. 1. Referring to FIG. 3, the supporting members 15 surround opposing ends of the frame 10, and the electrode assembly 20 surrounds the supporting members 15 and the frame 10. The compressing members 25 compress the opposing ends of the electrode assembly 20.

If the frame 10 and the supporting members 15 are formed of a conductive material, an insulating material (not shown) may be disposed between the frame 10 and the supporting members 15. That is, the frame 10 and the supporting members 15 may be insulated from each other. In addition, the anode and cathode terminals 50a and 50b may be insulated from each other and from the case 40.

FIG. 4 shows the cross-sectional structure of the electrode assembly 20. Referring to FIG. 4, the electrode assembly 20 includes anode plates 3, cathode plates 9, and separating layers 6 disposed therebetween. The anode plates 3, the separating layers 6, and the cathode plates 9 may be wound into a jellyroll-type shape.

The anode plates 3 are coated with a positive active material, and the cathode plates 9 are coated with a negative active material. An uncoated region R1 of the anode plates 3 may protrude from one side of the electrode assembly 20, and an uncoated region R2 of the cathode plates 9 may protrude from the other side of the electrode assembly 20.

The uncoated regions R1 and R2 are compressed between the supporting members 15, so as to be adhered together. Such compression lowers the contact resistance of, and increases the current collecting efficiency of, the electrode assembly 20.

Figure 5A:
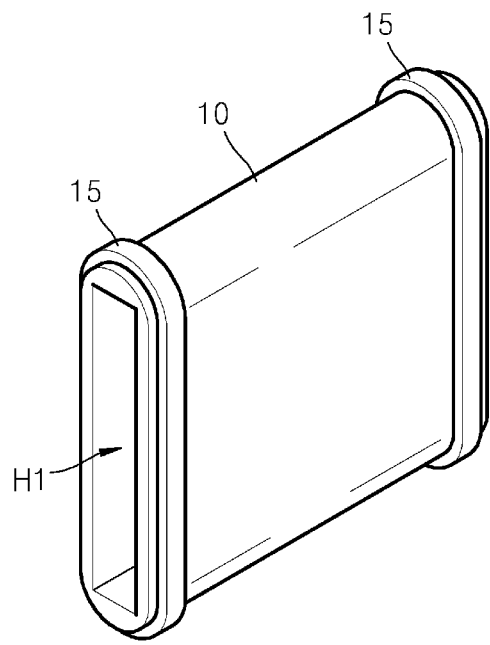
FIGS. 5A through 5C are perspective views showing a process of assembling the electrode assembly of FIG. 4.
Figure 5B:
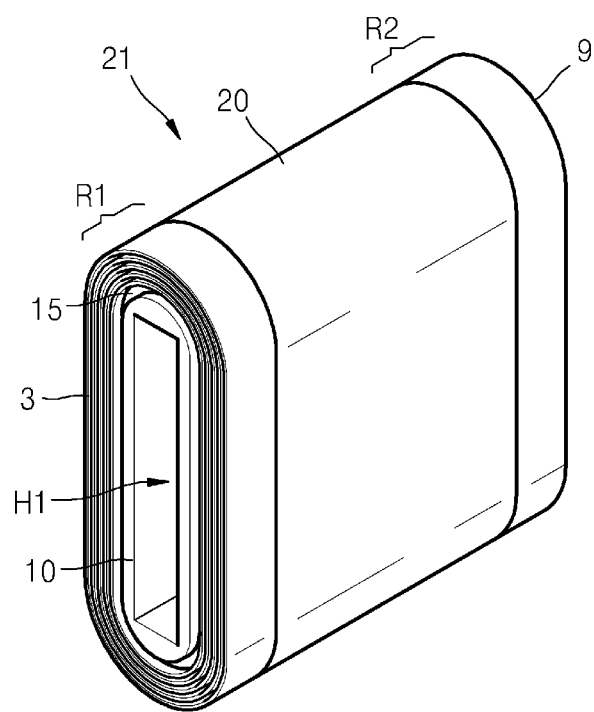
Figure 5C:
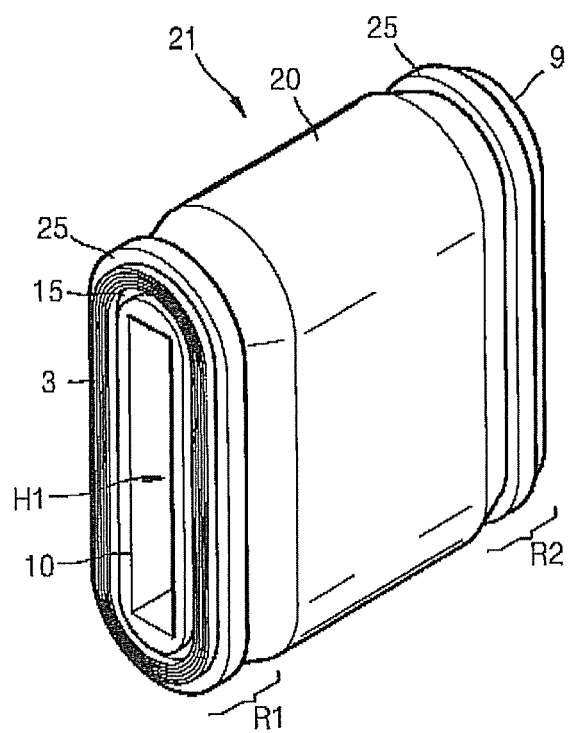

FIGS. 5A through 5C are perspective views showing a process of assembling the core pack 21, according to aspects of the present teachings. As shown in FIG. 5A, the frame 10 is formed, and then the supporting members 15 are disposed on opposing ends of the frame 10.

Next, as shown in FIG. 5B, the electrode assembly 20 is formed around the frame 10, by using the frame 10 as a roll core. The anode plates 3 in the anode uncoated region R1 may be separated from each other, and the cathode plates 9 in the cathode uncoated region R2 may be separated from each other.

As shown in FIG. 5C, the anode uncoated region R1 and the cathode uncoated region R2 are then compressed by the compressing members 25. The structure and fabrication process of the core pack 21 may be modified in various ways. For example, structures of the frame 10, the supporting members 15, and the compressing members 25 may be modified, and in some cases, the supporting members 15 and/or the compressing members 25 may not be used.

Figure 6:
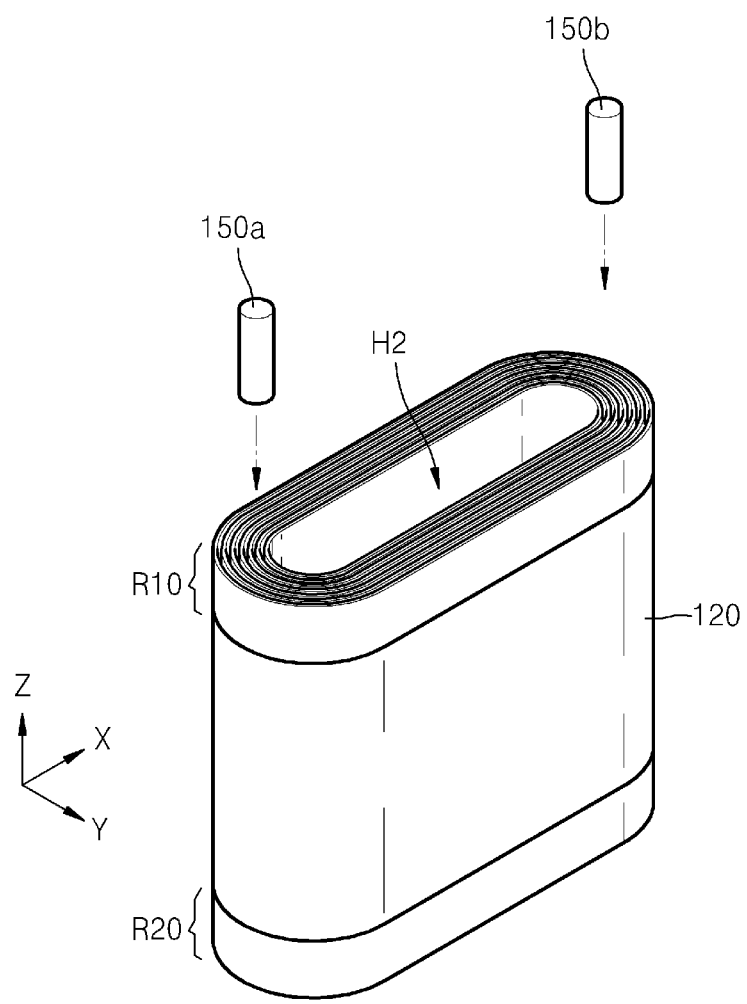
FIG. 6 is a perspective view of a battery according to a comparative example.

FIG. 6 is a perspective view of a battery according to a comparative example. When a cooling hole H2 and anode and cathode terminals 150a and 150b extend in the same direction (Z-axis direction), as shown in FIG. 6, it is easy to connect the anode terminal 150a to an anode uncoated region R10, however it is not easy to connect the cathode terminal 150b to a cathode uncoated region R20. Therefore, it may be difficult to collect electric current. In addition, since the anode terminal 150a and the cathode terminal 150b are formed on the same surface as the cooling hole H2, it may be difficult to seal the electrode assembly 120 in the battery.

However, according to the battery of the current exemplary embodiment, the cooling hole H1 extends in a different direction than the anode and cathode terminals 50a and 50b, as shown in FIGS. 1 through 3. Therefore, it is easy to connect the anode terminal 50a to the anode uncoated region R1, and the cathode terminal 50b to the cathode uncoated region R2. Therefore, the battery can efficiently collect electric current. In addition, when the uncoated regions R1 and R2 are compressed, the contact resistance thereof is reduced, and thus, it is much easier to collect electric current. Also, since the cooling hole H1 is formed in a different surface of the main body 100 than the anode and cathode terminals 50a and 50b, it is easy to seal the battery using a welding process. That is, the electrode assembly 20 may be sealed by welding the side walls 30 to the case 40 and the frame 10, and thus, sealing durability is excellent.

The battery of the current embodiment may be in various ways modified. For example, the outer appearance of the main body 100, of FIG. 1, may be modified in various ways. In FIG. 1, the main body 100 is formed as a rectangular column, but may be formed as a generally rectangular column having rounded corners. The main body 100 may also be formed so as to be ovoid or circular in cross-section.

Figure 7:
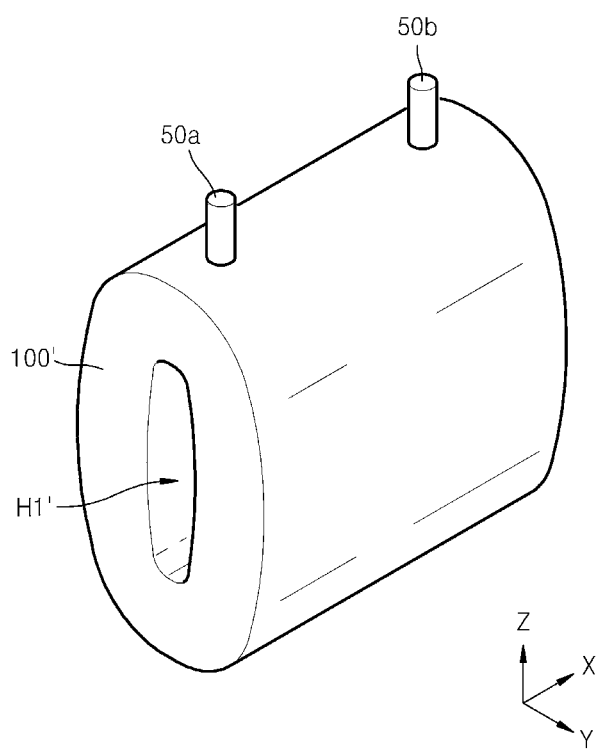
FIG. 7 is a perspective view of a battery, according to another exemplary embodiment.

FIG. 7 is a perspective view of a battery including a main body 100' that is an ovoid in cross-section and that extends along the XY plane. The main body 100' may have an ovoid cooling hole H1' that extends there through, in a lateral direction. The cooling hole H1' may also be rectangular, as shown in FIG. 1. Anode and cathode terminals 50a and 50b may protrude upward from the main body 100'. Other components of the battery are similar to those of the battery of FIG. 1, and thus, a detailed description thereof is omitted.

Figure 8:
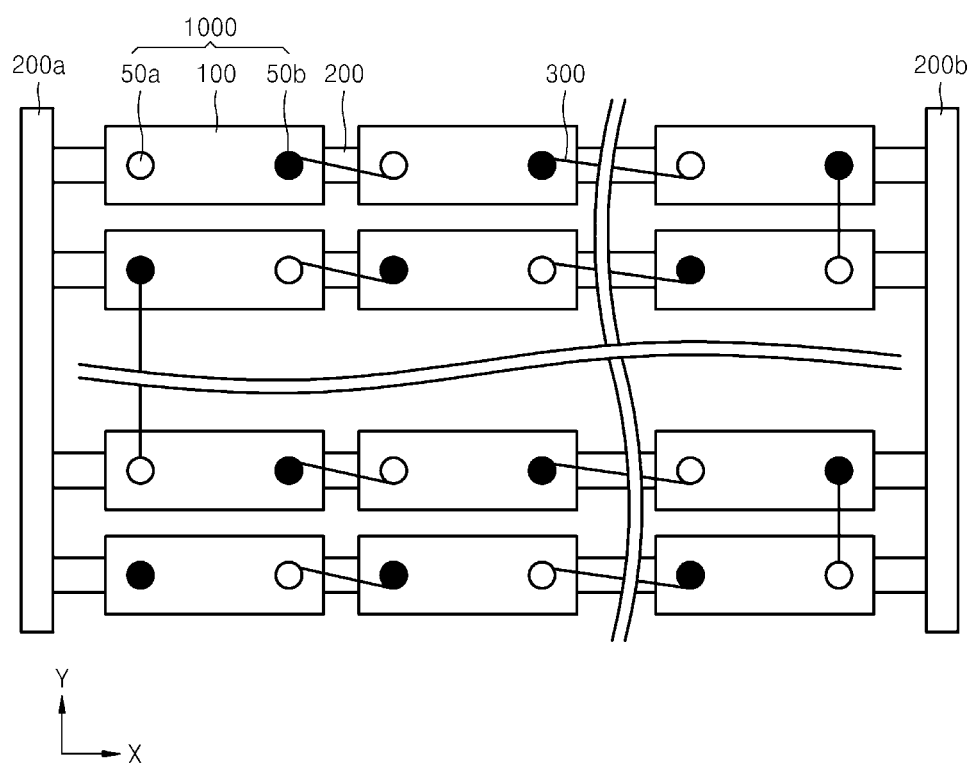
FIG. 8 is a plan view of a battery pack according to an exemplary embodiment.

FIG. 8 is a plan view of a battery pack, according to an exemplary embodiment of the present teachings. Referring to FIG. 8, the battery pack includes batteries 1000 arranged in a plurality of rows and columns. Each of the batteries 1000 may include a main body 100 and anode and cathode terminals 50a and 50b. The anode terminals 50a are represented as ○, and the cathode terminals 50b are represented as ●. Each battery 1000 may have the structure shown in FIG. 1; but may be modified in various ways, as described above. For example, each battery 1000 may have the structure shown in FIG. 7.

Cooling tubes 200 are inserted into cooling holes H1 (refer to FIG. 1) of the batteries 1000 that are included in the same columns. That is, the batteries 1000 in each of the columns may share one of the cooling tubes 200. A first common pipe 200a is commonly connected to first ends of the cooling tubes 200, and a second common pipe 200b is commonly connected to second ends of the cooling tubes 200. The first and second common pipes 200a and 200b may extend perpendicular to the cooling tubes 200. Cooling water may be supplied to the cooling tubes 200, through one of the first and second common pipes 200a and 200b, and may be drained through the other of the first and second common pipes 200a and 200b.

The batteries 1000 are connected in series. Reference numeral 300 denotes wires connecting the batteries 1000. Connections between the batteries 1000 may be modified in various ways. For example, some of the batteries 1000 may be connected in series and the others may be connected in parallel, or all of the batteries 1000 may be connected in parallel. According to the current embodiment, since the anode and cathode terminals 50a and 50b are formed on the upper portions of the batteries 1000, and the cooling tubes 200 penetrate the batteries 1000 in the lateral direction, the batteries 1000 may be easily connected in series or in parallel. If the cooling tubes 200 penetrate the batteries in a longitudinal direction, it may not be easy to connect the batteries 1000 in various ways, due to the cooling tubes 200.

It should be understood that the exemplary embodiments described therein should be considered in a descriptive sense only and not for purposes of limitation. Descriptions of features or aspects within each exemplary embodiment should typically be considered as available for other similar features or aspects in other embodiments. For example, one of ordinary skill in the art may recognize that the structures and components of the batteries shown in FIGS. 1 through 4 and FIG. 7, and the battery pack shown in FIG. 8, may be modified. In a concrete example, the electrode assembly 20 may have structures other than the jelly-roll type described above.

Although a few exemplary embodiments of the present teachings have been shown and described, it would be appreciated by those skilled in the art that changes may be made in these exemplary embodiments, without departing from the principles and spirit of the present teachings, the scope of which is defined in the claims and their equivalents.

What is claimed is:

1. A battery comprising:
   a main body;
   an electrode assembly housed in the main body; anode and cathode terminals that extend from the main body in a first direction,
   wherein a cooling hole extends through a pair of opposing sides of the main body, in a second direction different from the first direction;
   the electrode assembly comprises a first end portion and a second end portion, the first end portion is connected to the anode terminal and the second end portion is connected to the cathode terminal; and
   the battery further comprises a frame around which the electrode assembly is wound, and compressing members to compress the first end portion and the second end portion against the frame so that the first and second end portions have a more compressed structure than the other portions of the electrode assembly.

2. The battery of claim 1, wherein the first direction and the second direction are perpendicular to each other.

3. The battery of claim 1, wherein the cooling hole is rectangular or ovoid in cross-section.

4. The battery of claim 1, wherein the main body is a prismatic or ovoid in cross-section.

5. The battery of claim 1, wherein the frame at least partially defines the cooling hole.

6. The battery of claim 1, wherein the electrode assembly is wound around the frame in a jellyroll shape.

7. The battery of claim 6, wherein:
the electrode assembly comprises an anode uncoated region that corresponds to the first end portion of the electrode assembly, and a cathode uncoated region that corresponds to the second end portion of the electrode assembly;
the anode terminal is electrically connected to the anode uncoated region; and
the cathode terminal is electrically connected to the cathode uncoated region.

8. The battery of claim 7, wherein the compressing members are configured to compress the anode uncoated region and the cathode uncoated region against the frame.

9. The battery of claim 8, further comprising supporting members disposed between the anode uncoated region and the frame, and between the cathode uncoated region and the frame.

10. The battery of claim 8, wherein the anode terminal and the cathode terminal contact corresponding ones of the compressing members.

11. The battery of claim 5, wherein the main body comprises:
a case disposed around the electrode assembly; and
side walls disposed on opposing sides of the case, the side walls having through holes that at lease partially define the cooling hole, wherein the opposing sides of the case correspond to the pair of opposing sides of the main body.

12. A battery pack comprising a plurality of the batteries of claim 1, wherein the batteries are electrically connected and arranged in rows.

13. The battery pack of claim 12, further comprising cooling tubes that extend through the cooling holes of the batteries of each row.

14. The battery pack of claim 12, wherein the batteries are connected to each other in series, in parallel, or in a combination thereof.

15. The battery pack of claim 13, further comprising:
a first common pipe to supply a fluid to first ends of the cooling tubes; and
a second common pipe to receive the fluid from second ends of the cooling tubes.

16. A battery comprising:
a main body;
an electrode assembly housed in the main body, the electrode assembly comprising a first end portion and a second end portion;
anode and cathode terminals that extend from a first surface of the main body, the anode terminal being electrically connected to the first end portion and the cathode terminal being electrically connected to the second end portion,
wherein a cooling hole is formed in a second surface of the main body, the second surface being different from the first surface; and
the battery further comprises a frame around which the electrode assembly is wound, and compressing members to compress the first end portion and the second end portion against the frame.

17. A battery comprising:
a main body;
an electrode assembly housed in the main body; anode and cathode terminals that extend from the main body in a first direction, wherein:
a cooling hole extends through a pair of opposing sides of the main body, in a second direction different from the first direction,
the electrode assembly comprises a first end portion and a second end portion, the first end portion is connected to the anode terminal and the second end portion is connected to the cathode terminal,
the battery further comprises compressing members to compress the first end portion and the second end portion so that the first and second end portions have a more compressed structure than the other portions of the electrode assembly,
the electrode assembly comprises an anode uncoated region that corresponds to the first end portion of the electrode assembly, and a cathode uncoated region that corresponds to the second end portion of the electrode assembly, and
the compressing members are configured to compress the anode uncoated region and the cathode uncoated region against a frame.

18. The battery of claim 17, further comprising supporting members disposed between the anode uncoated region and the frame, and between the cathode uncoated region and the frame.

19. The battery of claim 17, wherein the anode terminal and the cathode terminal contact corresponding ones of the compressing members.

* * * * *